US012263618B2

(12) United States Patent
Martínez Galindo

(10) Patent No.: US 12,263,618 B2
(45) Date of Patent: Apr. 1, 2025

(54) MANUAL CERAMICS CUTTER WITH DETACHABLE ACCESSORIES

(71) Applicant: GERMANS BOADA, S.A., Rubi (ES)

(72) Inventor: David Martínez Galindo, Rubi (ES)

(73) Assignee: GERMANS BOADA, S.A., Rubi (ES)

( * ) Notice: Subject to any disclaimer, the term of this patent is extended or adjusted under 35 U.S.C. 154(b) by 469 days.

(21) Appl. No.: 17/562,713

(22) Filed: Dec. 27, 2021

(65) Prior Publication Data

US 2022/0118650 A1 Apr. 21, 2022

Related U.S. Application Data

(63) Continuation of application No. PCT/ES2020/070243, filed on Apr. 16, 2020.

(51) Int. Cl.

| | |
|---|---|
| ***B28D 7/00*** | (2006.01) |
| ***B28D 1/22*** | (2006.01) |
| ***B28D 7/04*** | (2006.01) |

(52) U.S. Cl.
CPC ................ *B28D 7/04* (2013.01); *B28D 1/22* (2013.01)

(58) Field of Classification Search
CPC ........... B28D 7/00; B28D 1/225; B28D 1/22; B28D 7/04
USPC ...................................................... 125/23.01
See application file for complete search history.

(56) References Cited

FOREIGN PATENT DOCUMENTS

| | | | | |
|---|---|---|---|---|
| CN | 205818193 U | * | 12/2016 | |
| CN | 108145870 A | * | 6/2018 | .............. B28D 1/24 |

* cited by examiner

*Primary Examiner* — Katina N. Henson
(74) *Attorney, Agent, or Firm* — Hodgson Russ LLP

(57) ABSTRACT

Disclosed is a manual ceramics cutter with detachable accessories, comprising: a base (1) for supporting a ceramic piece to be cut; a manually actuatable cutting head (2); guides (3) for moving the cutting head; and at least one detachable accessory (4*a*, 4*b*) for laterally supporting the ceramic piece to be cut and which is provided with fastening means (41) for fastening to the base (1) in an operative use position in which the detachable accessory (4*a*, 4*b*) is arranged transversely with respect to the base (1) and projects laterally from the base (1). The cutter comprises magnetic means (11, 42) for fastening the detachable accessory (4*a*, 4*b*) to the base of the cutter in an inoperative or transport position, wherein the accessory (4*a*, 4*b*) is arranged in a longitudinal direction on the base (1) and does not project practically from the base.

2 Claims, 3 Drawing Sheets

MANUAL CERAMICS CUTTER WITH DETACHABLE ACCESSORIES

CROSS-REFERENCE

This application is a continuation of International Application No. PCT/ES2020/070243, filed on Apr. 16, 2020, the entire disclosure of which is incorporated herein by reference.

TECHNICAL FIELD

The present invention is applicable in the sector dedicated to the manufacture of manual tools and in particular of manual ceramics cutters provided with detachable accessories for laterally supporting the ceramic pieces to be cut.

BACKGROUND

Currently, manual ceramics cutters are widely known in the market, comprising: a base for supporting the ceramic piece to be cut, a manually actuatable cutting head and longitudinal guides for moving the cutting head.

In manual cutters of this type, the supporting base can exhibit a variable length, to allow the placement of ceramic pieces of different dimensions, given the current trend of coating surfaces with large ceramic pieces to minimise the number of joints in the coating; however, in cutters of this type, the width of the supporting base is kept with rather reduced dimensions, in order to not excessively increase the size and weight of the cutter, and to facilitate the transport thereof.

To facilitate the correct placement and clamping of the ceramic pieces on the supporting base during the cutting operation, these cutters usually have detachable accessories for frontally and/or laterally supporting the ceramic piece. The detachable accessories are usually made up of a set-square and a lateral arm provided with fastening means for fastening to the base in an operative use position, in which the detachable accessories project laterally from the base.

Since these accessories significantly increase the overall width of the cutter, they must be detached from the supporting base to facilitate the transport or storage of the cutter.

When the accessories are inoperative and detached from the base, there is a risk of accidental deterioration of the accessories and loss thereof, which entails a considerable loss of time for the operator to locate them when reinstalling them in the cutter.

Therefore, the technical problem that arises is the development of a manual ceramics cutter that exhibits suitable technical features to prevent the loss or deterioration of the accessories once they have been detached from the cutter, and keep them within reach of the operator, without increasing the space required for storing the cutter, and so that the operator can easily locate them and re-attach them to the cutter in the operational use position when they need to be used.

SUMMARY

The manual ceramics cutter with detachable accessories, object of this invention, exhibits technical features aimed at satisfactorily solving the technical problem raised.

This manual ceramics cutter is of the type mentioned above and described in the preamble of the main claim; comprising: a base for supporting the ceramic piece to be cut, a manually actuatable cutting head, longitudinal guides for moving the cutting head, and at least one detachable accessory for laterally supporting the ceramic piece to be cut and which is provided with fastening means for fastening to the base in an operative use position, in which the detachable accessory is arranged transversely with respect to the base and projects laterally from the base.

To solve the technical problem raised, this cutter comprises magnetic fastening means for fastening at least one detachable accessory to the base of the cutter in an inoperative or transport position, in which the accessory is arranged longitudinally on the supporting base of the cutter and does not project practically from the surface of the base.

According to the invention, the magnetic fastening means comprise at least one pair of magnets and one pair of ferromagnetic bushings fastened to the upper surface of the base of the cutter and to the corresponding accessory, said bushings being dimensioned for receiving the respective magnets therein.

The aforementioned magnets are arranged longitudinally, close to one of the sides of the base, and the pair of bushings is aligned in the longitudinal direction of the detachable accessory in question, so that in the coupling position the accessory in question is oriented longitudinally on the supporting base and on one of the sides thereof.

The invention envisages that the magnets are fastened to the base and the bushings to the detachable accessories; however, it should be mentioned that said fastening can be in reverse, i.e., the bushings are fastened to the base and the magnets are fastened to the detachable accessories, since this does not change the essence of the invention.

According to the invention, the manual ceramics cutter comprises elastic stops installed between the magnets and the base of the cutter; said elastic stops forming, around the magnets, areas for supporting the accessory bushings when the accessory is installed on the base in an inoperative position.

The detachable accessory can be made up of a set-square, a lateral arm or any other elongated, detachable part that enables the ceramic piece to be laterally supported outside the base.

BRIEF DESCRIPTION OF THE DRAWINGS

As a complement to the description provided herein, and for the purpose of helping to make the features of the invention more readily understandable, the present specification is accompanied by a set of drawings which, by way of illustration and not limitation, represent the following.

DETAILED DESCRIPTION

Figure 1:
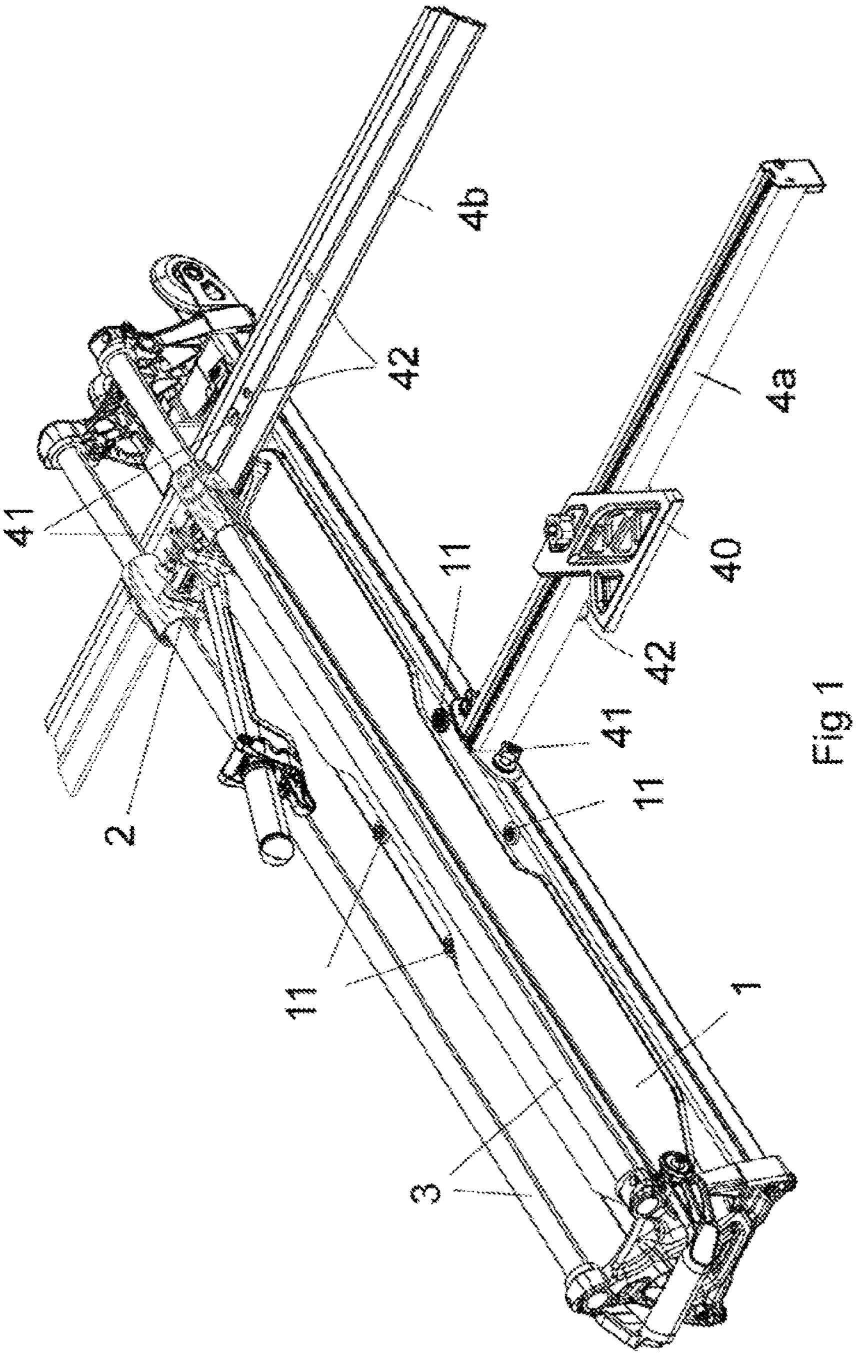
FIG. 1 shows a perspective view of an exemplary embodiment of the manual ceramics cutter with detachable accessories, according to the invention, wherein the detachable accessories are installed on the base of the cutter in the operative position, and are made up of a set-square and a lateral arm carrying an adjustable stop.

FIG. 1 shows a manual ceramics cutter with detachable accessories, according to the invention, comprising: a supporting base (1), a manually actuatable cutting head (2), longitudinal guides (3) for moving the cutting head (2) and detachable accessories (4*a*, 4*b*) for laterally supporting the ceramic pieces to be cut, said detachable accessories being represented by a set-square and by a lateral arm carrying an adjustable stop (40).

In said FIG. 1, the detachable accessories (4*a*, 4*b*) have been represented fastened to the base (1) by means of the corresponding screws (41) in an operative use position, in which they are oriented transversely with respect to the base projecting laterally from said base.

The base (1) comprises superiorly two pairs of magnets (11) forming magnetic means for fastening the detachable accessories (4*a*, 4*b*) in an inoperative or transport position.

Figure 2:
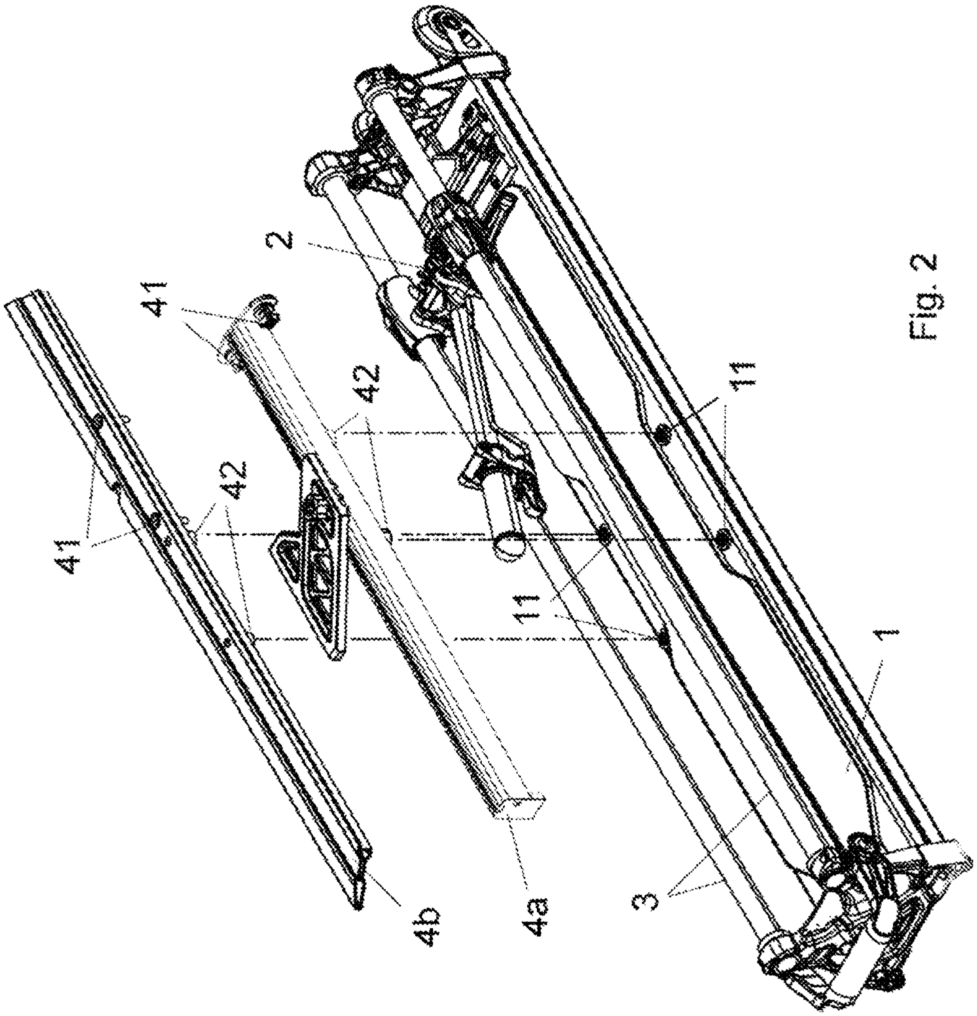
FIG. 2 shows a perspective view of the manual ceramics cutter of the previous figure, with the set-square and the lateral arm detached from the base, arranged above the base and aligned with the magnetic means responsible for fastening it on the base in the inoperative position.

FIG. 2 shows the detachable accessories (4*a*, 4*b*) detached from the base (1) and facing vertically the respective pairs of magnets (11). Each of the accessories (4*a*, 4*b*) has one pair of ferromagnetic bushings (42) dimensioned for receiving the respective magnets (11) responsible for fastening it in the inoperative position.

Figure 3:
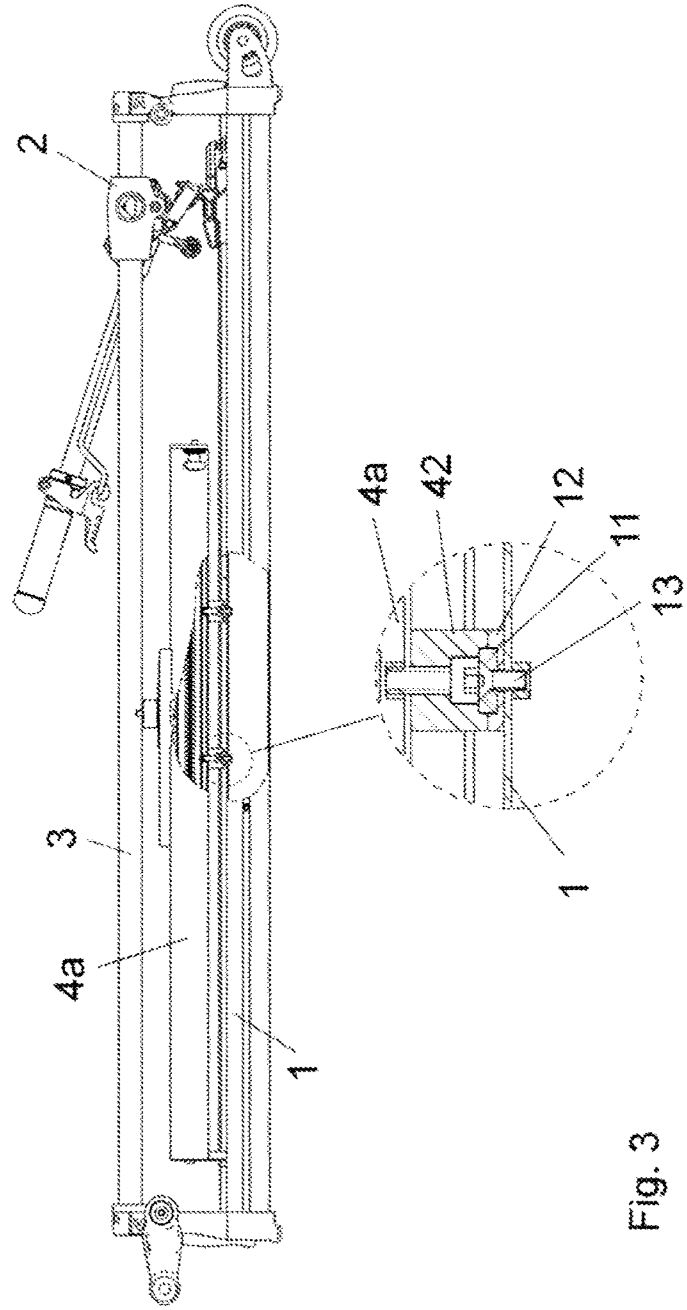
FIG. 3 shows an elevation view of the manual ceramics cutter of the previous figures with the lateral arm fastened on the base in the inoperative position by means of the magnetic fastening means. This figure has been represented partially cross-sectioned to allow the magnetic fastening means for fastening the detachable accessory on the base in the inoperative position to be viewed; and includes an enlarged detail of one of the magnetic fastening means.

FIG. 3 shows one of the detachable accessories (4*a*), specifically the set-square, held in the inoperative position on the base (1) by means of one of the pairs of magnets (11).

As can be seen in the enlarged detail of the aforementioned FIG. 3, the magnets (11) are fastened to the base (1) by means of screws (13), elastic stops (12) being installed between the magnets (11) and the base (1).

In the inoperative position for coupling the accessories (4*a*, 4*b*) on the base (1), the magnets (11) are housed in the bushings (42), which prevents the accessories (4*a* and 4*b*) from moving and disengaging from the magnets (11) due to a lateral impact, which would cause a disengagement of said accessories with a certain ease. With this feature, the accessories (4*a*, 4*b*) must be disengaged from the magnets (11) in a substantially vertical direction, i.e., in the direction in which the magnets (11) provide a greater magnetic attraction and fastening force for the detachable accessories.

Having sufficiently described the nature of the invention, in addition to a preferred exemplary embodiment, it is hereby stated for the relevant purposes that the materials, shape, size and layout of the described elements may be modified, provided that it does not imply altering the essential features of the invention claimed below.

The invention claimed is:

1. A manual ceramics cutter with detachable accessories, comprising:

a base configured to support a ceramic piece to be cut;

a manually actuatable cutting head;

guides configured to move the cutting head;

at least one accessory configured to laterally support the ceramic piece to be cut, wherein the accessory is movable between an operative use position, in which the accessory is arranged transversely with respect to the base, and an inoperative or transport position, in which the accessory is arranged in a longitudinal direction on the base; and a magnetic fastening system configured to fasten the accessory to the base in the inoperative or transport position;

wherein:

the accessory is detachable from the base;

screws are provided for fastening the accessory to the base in the operative use position;

the accessory does not project from a surface of the base when the accessory is installed on the base in the inoperative or transport position;

the magnetic system comprises at least one pair of magnets fastened to the base and one pair of ferromagnetic bushings fastened to the base of the cutter or vice versa, said pair of ferromagnetic bushings being dimensioned and positioned for receiving the pair of magnets therein when the accessory is installed on the base in the inoperative or transport position, thereby preventing the accessory from moving and disengaging from the pair of magnets due to a lateral impact; and each magnet of the pair of magnets is fastened to an upper surface of the base by means of a screw, and an elastic stop is installed between each magnet and the base, the elastic stop forms around the magnets at a lower level than an upper part of the magnets and is configured for supporting the bushings of the accessory when the accessory is installed on the base in the inoperative or transport position.

2. The manual ceramics cutter according to claim 1, wherein the detachable accessory includes a set-square or a lateral arm with an adjustable stop for supporting the ceramic piece to be cut.

* * * * *